US008894517B2

(12) United States Patent
Lammer

(10) Patent No.: US 8,894,517 B2
(45) Date of Patent: *Nov. 25, 2014

(54) SPORTING GOODS WITH GRAPHENE MATERIAL

(71) Applicant: Head Technology GmbH, Kennelbach (AT)

(72) Inventor: Herfried Lammer, St. Veit (AT)

(73) Assignee: Head Technology GmbH, Kennelbach (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/690,693

(22) Filed: Nov. 30, 2012

(65) Prior Publication Data

US 2013/0090193 A1 Apr. 11, 2013

Related U.S. Application Data

(63) Continuation of application No. 12/618,512, filed on Nov. 13, 2009, now Pat. No. 8,342,989.

(60) Provisional application No. 61/114,901, filed on Nov. 14, 2008.

(51) Int. Cl.
  *A63B 49/10* (2006.01)
  *B29C 70/46* (2006.01)
  *B29C 70/02* (2006.01)

(52) U.S. Cl.
  CPC .............. *A63B 49/10* (2013.01); *B29C 70/46* (2013.01); *B29C 70/025* (2013.01); *A63B 2209/00* (2013.01); *A63B 2209/023* (2013.01)
  USPC ............................ 473/536; 473/535; 473/537

(58) Field of Classification Search
  USPC .......................................... 473/524, 535–537
  See application file for complete search history.

(56) References Cited

U.S. PATENT DOCUMENTS

| 5,419,554 | A | * | 5/1995 | Krone et al. ................... 473/535 |
| 5,897,447 | A | * | 4/1999 | Nishihara ...................... 473/535 |
| 6,709,347 | B1 | * | 3/2004 | Ono et al. ...................... 473/319 |
| 7,018,601 | B2 | * | 3/2006 | Yanagisawa et al. ....... 423/447.1 |
| 7,044,869 | B2 | | 5/2006 | Mauser et al. |
| 7,059,981 | B2 | * | 6/2006 | Ashino et al. ................. 473/535 |
| 7,077,767 | B2 | | 7/2006 | Mauser et al. |
| 7,151,129 | B2 | | 12/2006 | Ishikawa et al. |
| 7,273,430 | B2 | | 9/2007 | Ashino et al. |

(Continued)

FOREIGN PATENT DOCUMENTS

JP 2003-201388 * 7/2003 .............. C08L 63/00

OTHER PUBLICATIONS

Sean Spindler Ranta and Charles E. Baks, Carbon Nanotube Reinforcement of a Filament Winding Resin (USA), 47.sup.th International SAMPE Symposium Proceedings, May 12 to 16, 2002, p. 1775 to 1787.

(Continued)

*Primary Examiner* — Raleigh W Chiu
(74) *Attorney, Agent, or Firm* — Bookoff McAndrews, PLLC

(57) ABSTRACT

A racket may include a frame including at least one prepreg layer. The at least one prepreg layer may include reinforcing fibers. The at least one prepreg layer may also include a matrix at least partially surrounding the reinforcing fibers. The at least one prepreg layer may also include graphene material.

26 Claims, 15 Drawing Sheets

(56) References Cited

U.S. PATENT DOCUMENTS

| | | | |
|---|---|---|---|
| 2005/0186378 A1* | 8/2005 | Bhatt | 428/36.9 |
| 2005/0242471 A1* | 11/2005 | Bhatt et al. | 264/400 |
| 2006/0025515 A1* | 2/2006 | Scaringe et al. | 524/496 |
| 2006/0160636 A1* | 7/2006 | Palumbo et al. | 473/316 |
| 2006/0194946 A1* | 8/2006 | Thompson et al. | 528/491 |
| 2008/0299395 A1* | 12/2008 | Strange et al. | 428/409 |

OTHER PUBLICATIONS

Novoselov, K.S. et al., Electric Field Effect in Atomically Thin Carbon Films, Science 306, p. 666-669 (2004).

English Translation of JP Patent Application Pub. 2003-201388, Jul. 18, 2002.

Non-final Office Action from co-pending U.S. Appl. No. 12/618,512, mailed Jul. 11, 2011, (5 pages).

Reply to Office Action from co-pending U.S. Appl. No. 12/618,512, filed Dec. 12, 2011, (8 pages).

Final Office Action from co-pending U.S. Appl. No. 12/618,512, mailed Feb. 15, 2012, (6 pages).

Amendment after Final from co-pending U.S. Appl. No. 12/618,572, filed Aug. 14, 2012,(7 pages).

Notice of Allowability from co-pending U.S. Appl. No. 12/618,512, mailed Aug. 23, 2012, (1 page).

* cited by examiner

SPORTING GOODS WITH GRAPHENE MATERIAL

CROSS-REFERENCE TO RELATED APPLICATIONS

This is a Continuation Application of U.S. patent application Ser. No. 12/618,512, filed Nov. 13, 2009, which is incorporated herein by reference in its entirety. This application claims the benefit of U.S. Provisional Application No. 61/114,901, filed Nov. 14, 2008. The content of this provisional application is included herein by reference.

TECHNICAL FIELD

The present disclosure relates to sporting goods, and more particularly, sporting goods made with graphene material and processes for making such sporting goods.

BACKGROUND

Sporting goods include rackets, golf clubs, skis, snowboards, athletic footwear, padding and protective equipment, and/or other types of sports products known in the art. Sporting goods may be designed to provide a user with a competitive advantage, improve durability, enhance the user's comfort, or protect the user from being injured. The marketability of sporting goods may depend on how effective they are at providing such benefits. As such, manufacturers of sporting goods continually seek to improve the materials and designs used in the construction of their products.

While adding material to sporting goods may improve their ability to resist wear, absorb impacts, dampen vibrations, or perform other advantageous functions, it may also add bulk and weight to the sporting goods. The added bulk and weight may negate the advantages by increasing a user's discomfort, or hindering a user's movement or performance. Thus, sporting goods are often times constructed of lightweight, thin materials. However, if the materials are too thin or weak, they may lose their effectiveness, or may be easily damaged. A balance must be struck between these considerations.

One attempt to strike the proper balance involves the use of fiber-reinforced composite materials that include reinforcing fibers in resin material. Such materials have been used in rackets, for example. The use of these materials in a racket makes the racket light in weight, and gives it relatively high strength in the direction of tension of the fibers or laminate plane, as compared to other types of conventional rackets. However, these fiber-reinforced composite materials may have highly anisotropic properties, with the stiffness and strength in a direction at right angles to the laminate planes being extremely low compared with the stiffness and strength within the laminate planes. One reason for this is that the strength of the fibers may contribute lithe to the strength of the composite material in directions other than within the laminate planes. Rather, strength in those other directions may be dependent on the resin. Thus, even though the in-plane strength of the fiber-reinforced composite materials can be improved by changing or further reinforcing the reinforcing fibers, the strength in other directions, provided by the resin, may not be improved by making those changes. Thus, the resin-dependent strength may limit the overall strength of the fiber-reinforced composite material.

The present disclosure addresses at least some of the problems described above and other problems in existing sporting goods technology.

SUMMARY OF THE DISCLOSURE

In accordance with one aspect of the disclosure, a racket may include a frame including at least one prepreg layer. The at (east one prepreg layer may include reinforcing fibers. The at least one prepreg layer may also include a matrix at least partially surrounding the reinforcing fibers. The at least one prepreg layer may further include graphene material.

In accordance with another aspect of the disclosure, a racket may include a frame including at least one prepreg layer. The at least one prepreg layer may include reinforcing fibers. The at least one prepreg layer may also include a matrix at least partially surrounding the reinforcing fibers. The at least one prepreg layer may further include at least one layer of graphene material.

In accordance with another aspect of the disclosure, a sporting good may include at least one prepreg layer. The prepreg layer may include reinforcing fibers. The prepreg layer may also include a matrix at least partially surrounding the reinforcing fibers. The prepreg layer may further include graphene material.

In accordance with yet another aspect of the disclosure, a method of making a racket may include preparing a sheet of material. The sheet of material may include a plurality of reinforcing fibers. The sheet of material may also include a matrix at least partially surrounding the plurality of reinforcing fibers. The sheet of material may further include graphene. The method may also include inserting the sheet of material into a racket-shaped mold. The method may further include molding the sheet of material to form the racket.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate several embodiments of the disclosure and together with the description, serve to explain the principles of the disclosure.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
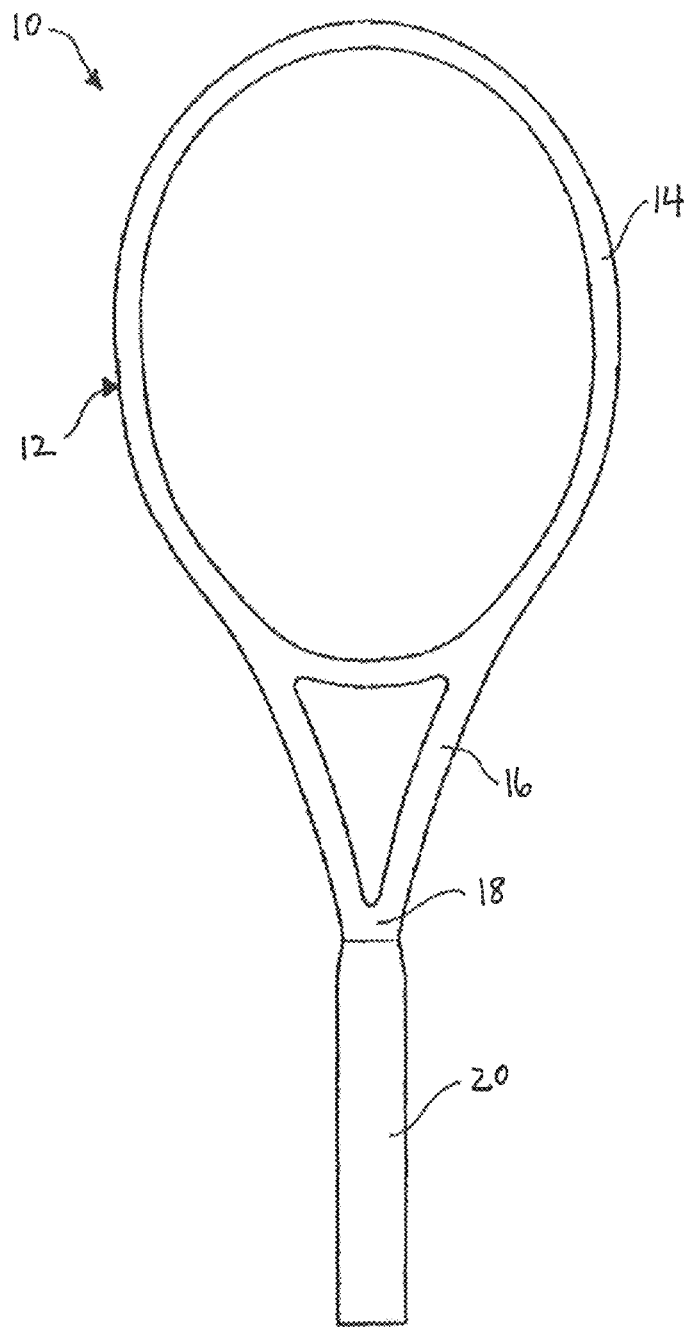
FIG. 1 is a front view of a racket, according to one aspect of the present disclosure.

Sporting goods may include rackets for ball sports, including, for example, tennis, racketball, squash, badminton, and paddle tennis. An exemplary tennis racket 10 is shown in FIG. 1. Racket 10 may include a frame 12. Frame 12 may include a plurality of regions, such as, a head region 14, a throat region 16, a shaft region 18, and a handle region 20.

Figure 2:
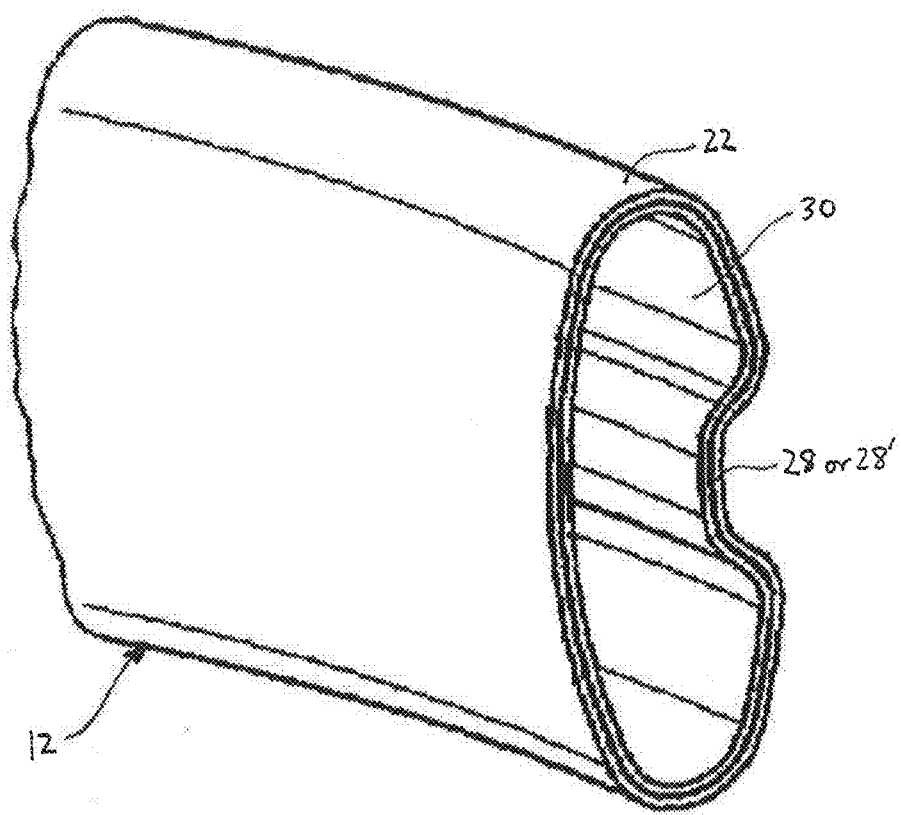
FIG. 2 is a partial section view of the racket of FIG. 1, according to the present disclosure.
Figure 3:
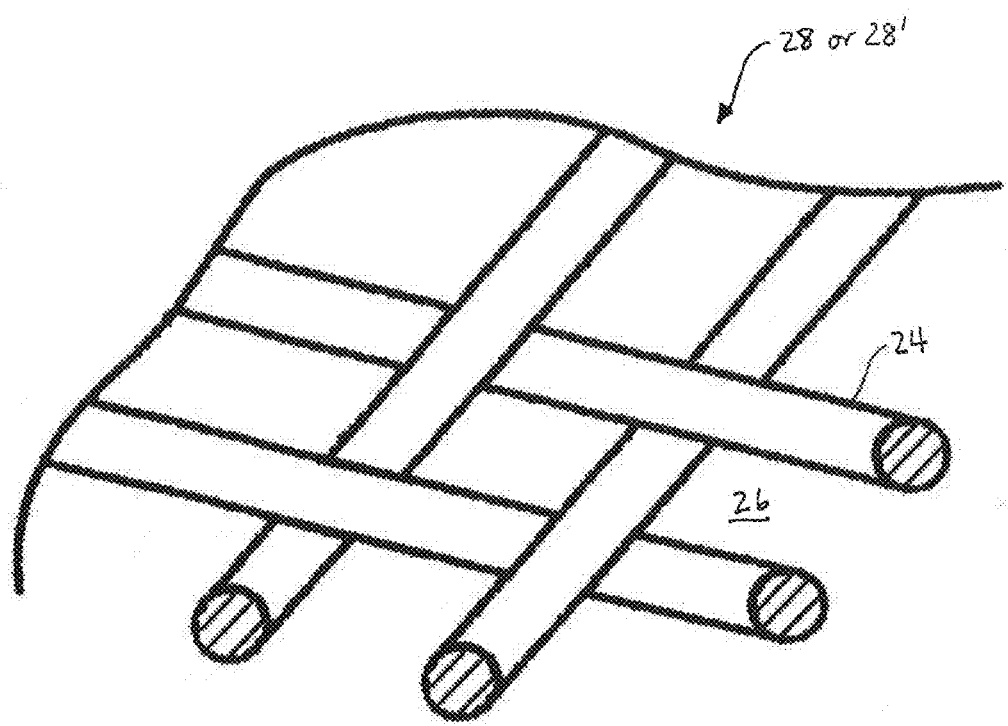
FIG. 3 is a partial perspective view of an embodiment of prepreg material, according the present disclosure.
Figure 4:
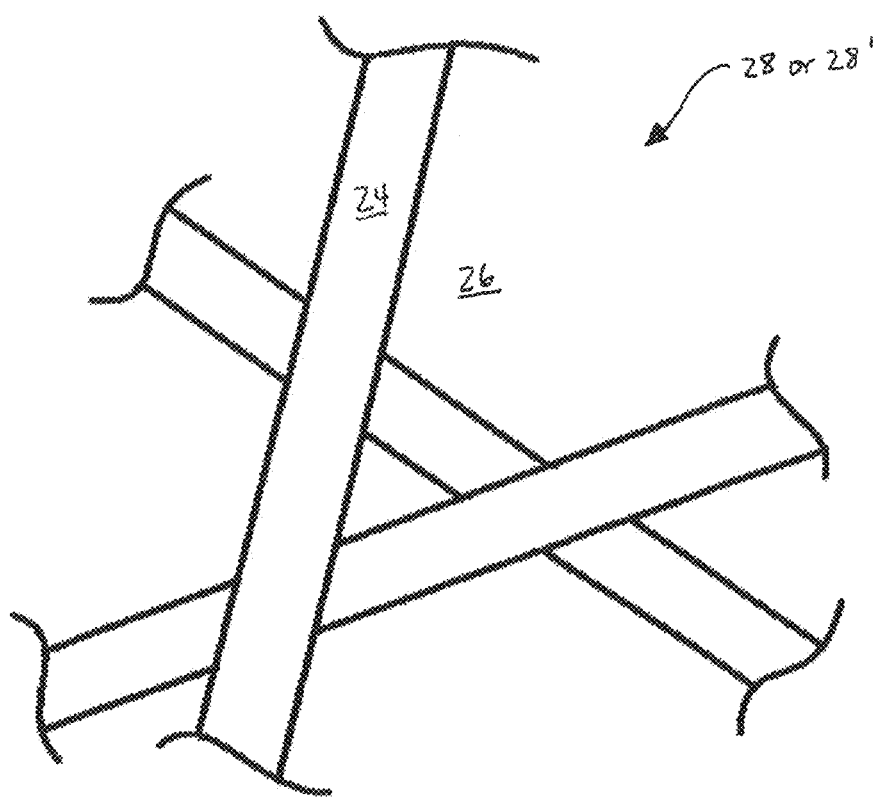
FIG. 4 is a partial top view of another embodiment of prepreg material, according to the present disclosure.

Frame 12 may be at least partially constructed of a fiber-reinforced resin prepreg 22, shown in section view in FIG. 2. Prepreg 22 may include at least one layer 28 or 28' of material wrapped around or otherwise surrounding a hollow or foam-filled central region 30. Prepreg layer 28 may include reinforcing fibers 24 at least partially surrounded by a matrix 26, with exemplary embodiments of this construction being shown in FIGS. 3-6. Reinforcing fibers 24 may be at least partially woven (as shown in FIG. 3), at least partially non-woven (as shown in FIG. 4), arranged in a single direction (e.g., substantially parallel to an exterior surface of frame 12) or in multiple directions, and may include short fibers and/or long fibers. Reinforcing fibers 24 may include carbon fibers, boron fibers, glass fibers, silicon carbide fibers, ceramic fibers, and/or aramid fibers of the kind available under the trade name KEVLAR. Prepreg layer 28' may also include reinforcing fibers 24 and matrix 26.

Reinforcing fibers 24 may be arranged in a single ply. Additionally or alternatively, reinforcing fibers 24 may be arranged in a plurality of plies or layers that may be laminated together. Matrix 26 may surround reinforcing fibers 24, and may include a cured or otherwise solidified resin. Matrix 26 may include, for example, a polyester resin, a vinylester resin, an epoxy resin, and/or any other suitable resin known in the art.

Figure 5:
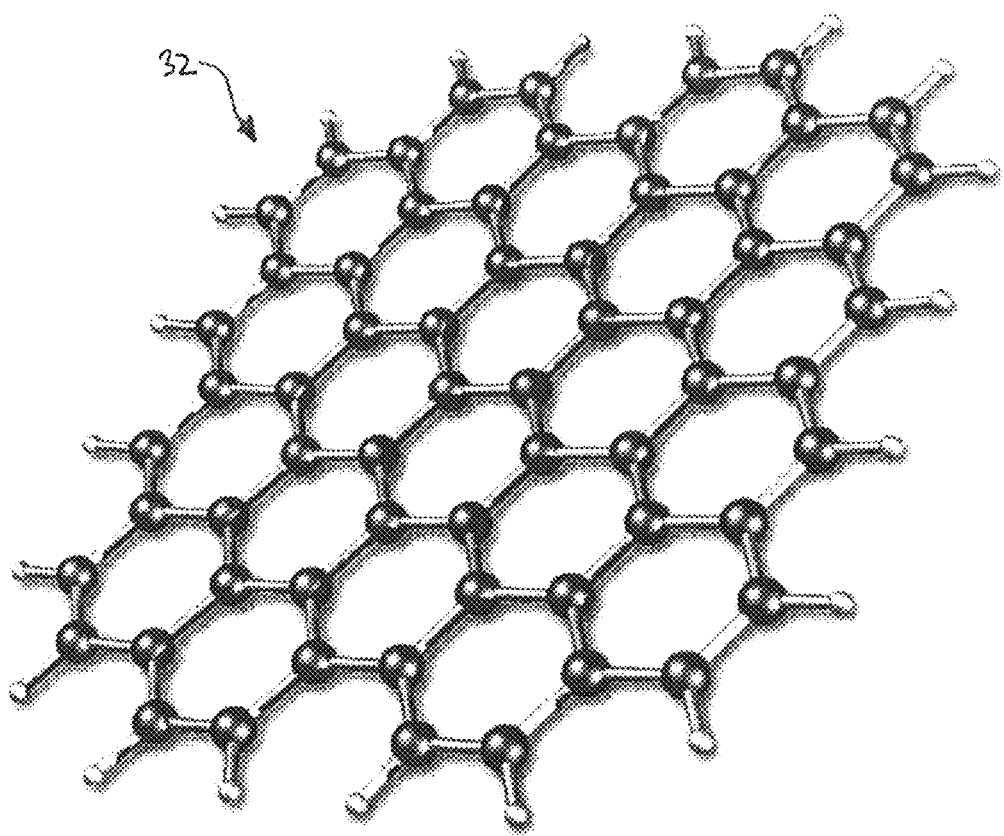
FIG. 5 is a perspective view of graphene, in accordance with the present disclosure.

In addition to reinforcing fibers 24 and matrix 26, graphene 32 may be used in the construction of the prepreg 22 of frame 12. Graphene 32 may include a single planar sheet of $sp^2$-bonded carbon atoms that are densely packed in a honeycomb crystal lattice, and may resemble an atomic-scale chicken wire made of carbon atoms and their bonds, as shown in FIG. 5. The carbon-carbon bond length in graphene 32 is approximately 0.142 nanometers. While perfect graphenes may include only hexagonal cells, imperfections may be introduced to create non-planar shapes. For example, insertion of a pentagonal cell may warp planar graphenes into cone shapes. Inserting twelve pentagonal cells may create a fullerene. Likewise, inserting an isolated heptagonal cell may cause planar graphenes to become saddle-shaped. Controlled addition of pentagons, heptagons, and/or other imperfections may allow a wide variety of complex shapes to be made, including, for example, nanobuds and nanotubes.

Graphene 32 may be formed into particles, flakes, sheets, layers, paper, and/or any other suitable form, for use in the construction of prepreg 22 of frame 12. Graphene 32 possesses stiffness and strength that is superior to bulk graphite and other known materials, and may impart those characteristics to frame 12 when used therein.

Figure 6:
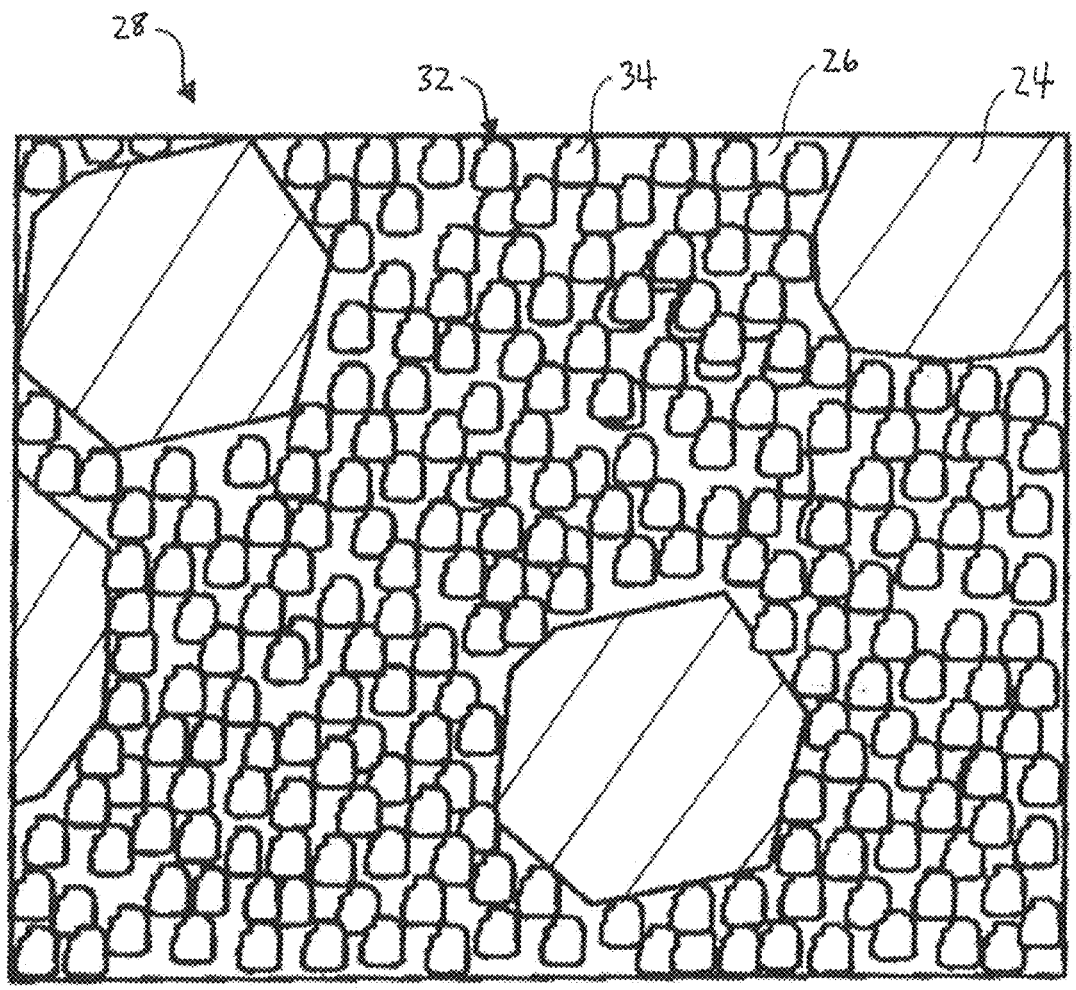
FIG. 6 is a section view of an embodiment of prepreg material, according to the present disclosure.

According to one aspect of the present disclosure, graphene 32 may be mixed in with and/or used as a filler in matrix 26 of prepreg layer 28, as shown in FIG. 6. For example, graphene 32 may be formed into particles and/or flakes 34, which may be mixed in with matrix 26. Graphene particles 34 may include, for example, nanoparticles of graphene 32. The mixing may take place while matrix 26 is in an uncured or liquid form. After mixing, particles and/or flakes 34 of graphene 32 may be dispersed throughout matrix 26. When matrix 26 is cured or otherwise solidified, the strength and modulus of matrix 26 may be enhanced by the graphene particles and/or flakes 34. Moreover, based on a composite potential between reinforcing fibers 24 and matrix 26, reinforcing fibers 24 and matrix 26 may be joined together strongly with graphene particles and/or flakes 34, and thus, the interlaminar and compressive strengths of prepreg layer 28 may be improved over that of a conventional prepreg. Graphene 32 may make up approximately ten percent or less of the mixture it forms with matrix 26, or more preferably, approximately two percent or less, by weight. By setting the composition of the mixture in this range, proper binding of graphene 32 with matrix 26 may be ensured, and any deterioration of the physical properties of the mixture due to lack of binding may be avoided. The volumetric content of reinforcing fibers 24 in prepreg 22 may be in a range of approximately ten percent to seventy percent. By setting the volumetric content of reinforcing fibers 24 in this range, a balance can be achieved between the in-plane strength of prepreg layer 28, which may be based primarily on the strength imparted by reinforcing fibers 24, and other types of strength, such as the compressive strength of prepreg layer 28, which may be based primarily on the strength imparted by matrix 26. It is contemplated that a plurality of graphene-reinforced prepreg layers, constructed in the manner of prepreg layer 28, may be used to construct prepreg 22. For example, the plurality of layers may be laminated or otherwise bonded to make prepreg 22.

Figure 7:
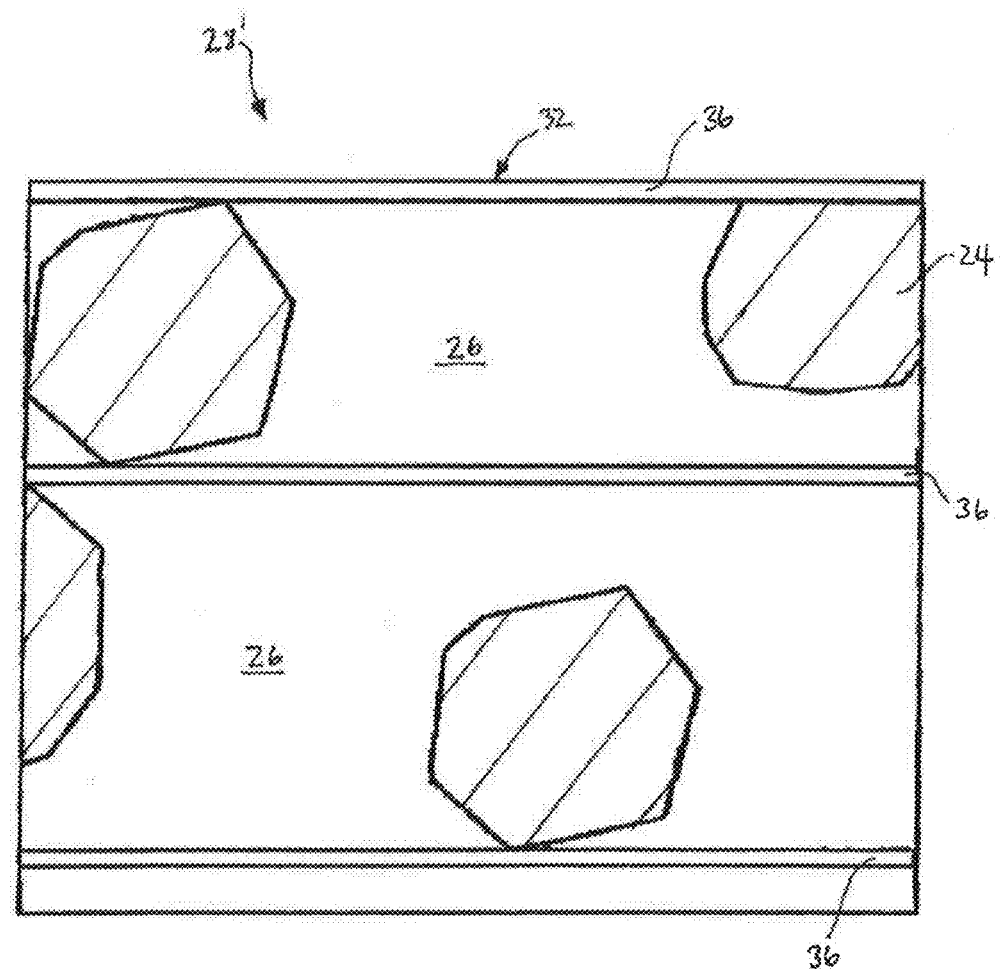
FIG. 7 is a section view of another embodiment of prepreg material, according to the present disclosure.
Figure 8:
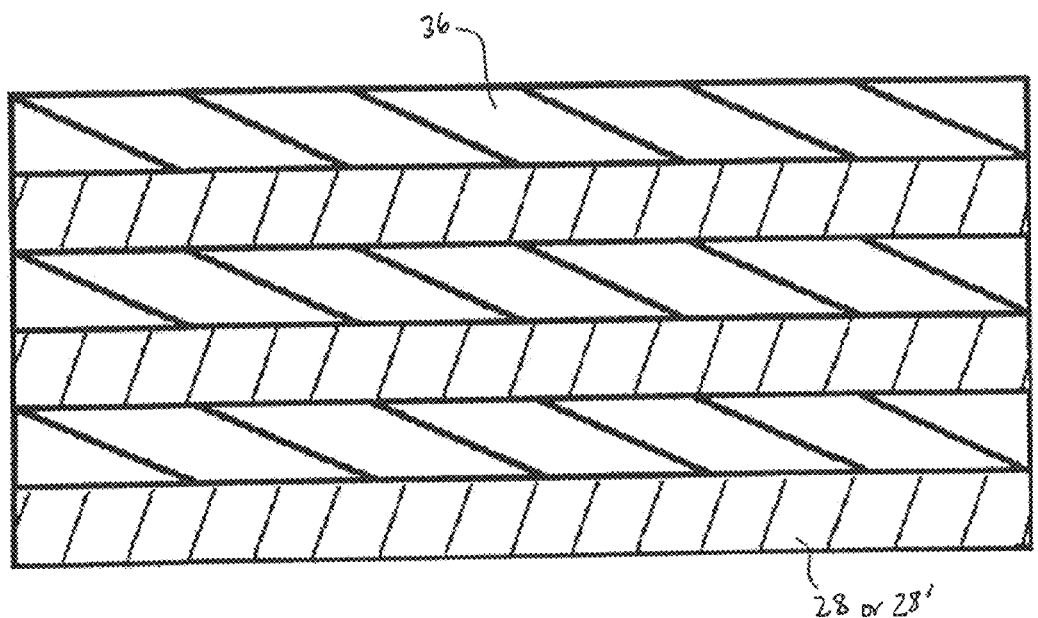
FIG. 8 is a section view of yet another embodiment of prepreg material, according to the present disclosure.

According to another aspect of the present disclosure, graphene 32 may be formed into one or more graphene layers 36, as shown in FIGS. 7 and 8. Those graphene layers 36 may be used in the construction of prepreg 22. Graphene layers 36 may include, for example, one or more sheets of graphene 32 and/or graphene paper. The one or more sheets of graphene may be made entirely of graphene 32, while the graphene paper may be made of a composite of graphene 32 and an interwoven layer structure (not shown). Such graphene layers 36 may possess exceptional stiffness and strength, due to the intrinsic strength of graphene 32.

As shown in FIG. 7, graphene layers 36 may be applied to a ply of reinforcing fibers 24, between plies of reinforcing fibers 24, and/or to matrix 26, in prepreg layer 28' of prepreg 22. A plurality of graphene-reinforced prepreg layers, constructed in the manner of prepreg layer 28', may be used to construct prepreg 22. The plurality of layers may be laminated or otherwise bonded to make prepreg 22.

According to another aspect of the present disclosure, one or more graphene layers 36 may be applied on and/or between prepreg layers 28 or 28'. One such embodiment is shown in FIG. 8. Prepreg layers 28 or 28' and one or more graphene layers 36 may be laminated or otherwise bonded to form prepreg 22. It is contemplated that one, a few, or all of prepreg layers 28 or 28' may include one or more internal graphene layers 36, in the manner described with respect to FIGS. 6 and 7. It is also contemplated that prepreg 22 may include prepreg layers with any combination of the features of prepreg layers 28 and 28' shown in FIGS. 6 and 7.

An exemplary process for making rackets, such as racket 10, will now be described. Reference will be made to elements in FIGS. 1-9. As described above, racket 10 include frame 12, and frame 12 may be formed by prepreg 22. Thus, the process of making racket 10 may begin with making prepreg 22, and more particularly, with making the prepreg layer used to construct prepreg 22.

One exemplary process for making the prepreg layer may result in producing prepreg layer 28. This process involves mixing particles and/or flakes 34 of graphene 32 into uncured matrix 26, which may be in the form of a liquid. Next, uncured matrix 26 may be applied to one or more plies of reinforcing fibers 24 as a coating, or may be injected into one or more plies of reinforcing fibers 24. Uncured matrix 26 may penetrate into one or more plies of reinforcing fibers 24, thus impregnating it with uncured matrix 26. If a plurality of plies of reinforcing fibers 24 are used in the construction of prepreg layer 28, those plies may be laminated together prior to being coated or injected with uncured matrix 26.

Matrix 26 may undergo curing, forming a substantially flat sheet 38 including of one or more plies of reinforcing fibers 24 and cured matrix 26. Substantially flat sheet 38 may be used to form prepreg layer 28. Additionally or alternatively, a plurality of substantially flat sheets may be laminated or otherwise bonded, and that laminate may be used to form prepreg layer 28.

Additionally or alternatively, the process for making the prepreg layer may produce prepreg layer 28'. This process may include applying one or more graphene layers 36 to one or more plies of reinforcing fibers 24 and/or uncured matrix 26. Additionally or alternatively, the process may include applying one or more graphene layers 36 to a substantially flat sheet similar to substantially flat sheet 38 described above, or between substantially flat sheets in a stacked arrangement. Graphene layers 36 and the one or more substantially flat sheets may then be laminated or otherwise bonded, and the laminate may be used to for prepreg layer 28'. It should be understood that any combination of the above processes may be used to form the prepreg layer. For example, the prepreg layer may include graphene particles and/or flakes in matrix 26, in the manner of prepreg layer 28, as well as one or more graphene layers 36, in the manner of prepreg layer 28'.

Figure 9:
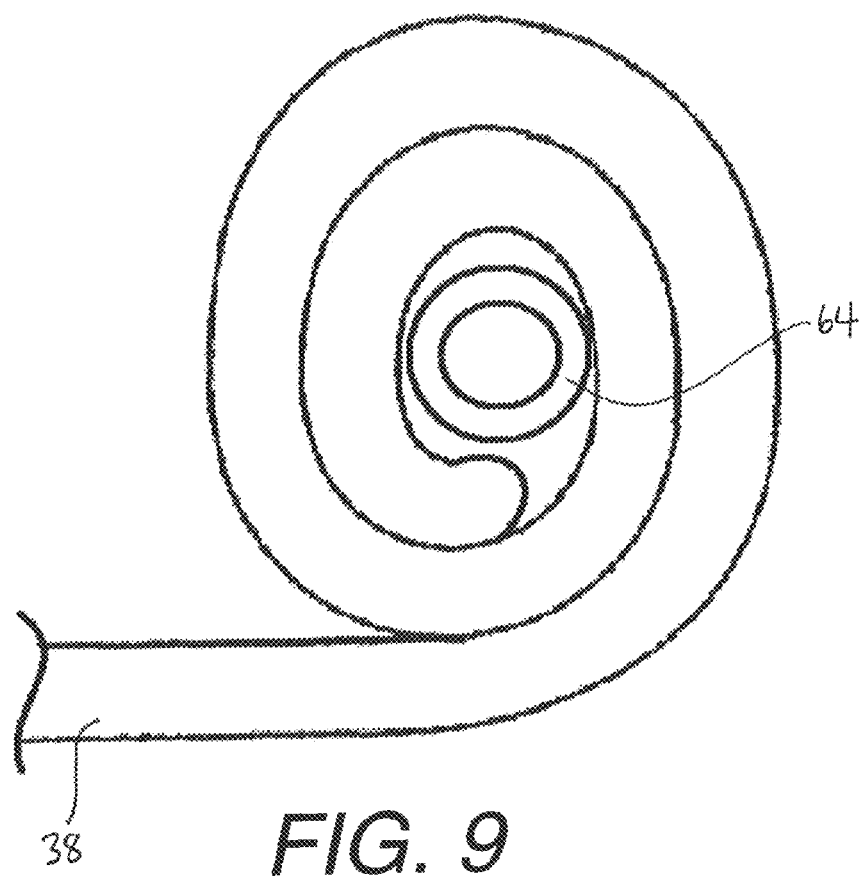
FIG. 9 is a section view of prepreg material wrapped around a tube, according to the present disclosure.

With the substantially flat sheet 38 thus formed, the process of molding substantially flat sheet 38 may begin. First, substantially flat sheet 38 may be cut into strips. A strip may be rolled around a hollow, flexible tube 64. The strip may be rolled in such a way that multiple strip layers surround tube 64, as shown in FIG. 9. Additionally or alternatively, multiple strips may be wrapped onto tube 64 to provide multiple strip layers. The wrapped tube 64 may then be placed into a racket-shaped mold (not shown). Tube 64 may be connected to a pump (not shown). The mold may be heated, and air may be pumped into tube 64 to expand the strip layers into the interior surfaces of the mold. The pressure of the air in tube 64, along with the heat, may bond the strip layers, forming them into prepreg 22. Each of the strip layers may form one layer of prepreg 22. Additionally or alternately, tube 64 may be filled with polyurethane foam (not shown). The foam may expand as the mold is heated, causing the layers of the strip to bond. After molding, prepreg 22 may be removed from the mold.

Due to the shape of the mold, prepreg 22 may have the shape of frame 12 of racket 10 shown in FIG. 1.

Figure 10:
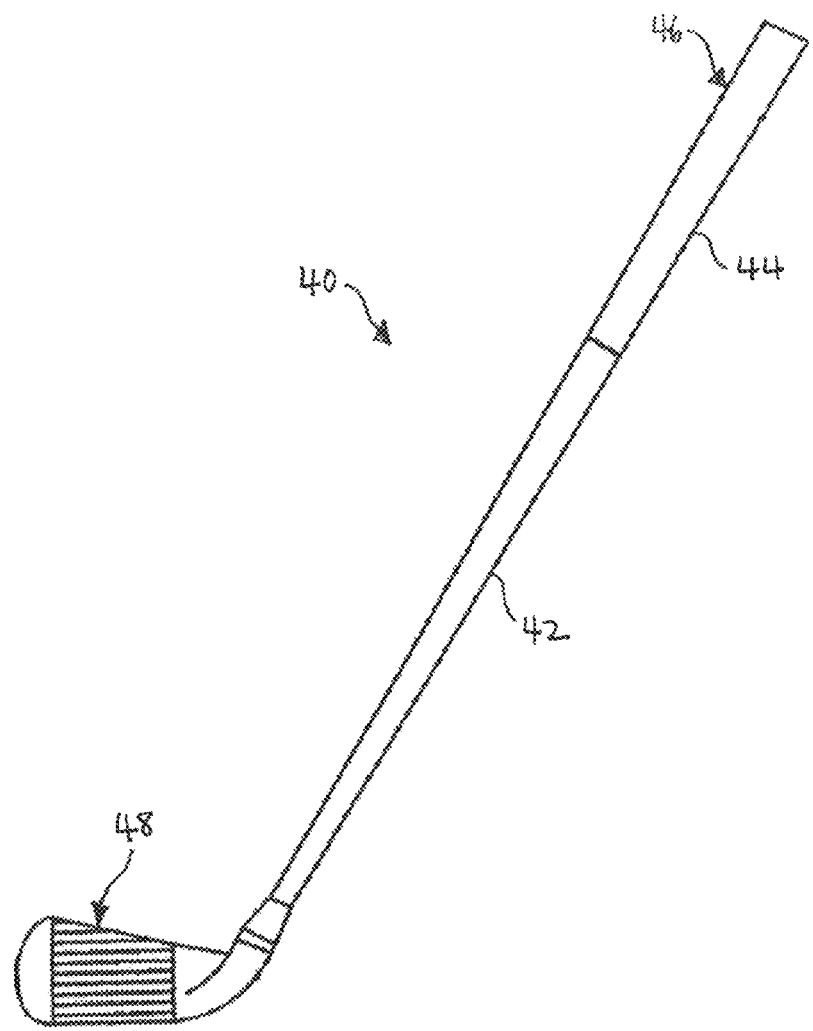
FIG. 10 is a front view of a golf club, according to the present disclosure.

The above-described processes may be used in the construction of racket frames of any kind, including, for example, tennis, racketball, squash, badminton, and paddle tennis. It is also contemplated that similar processes may be used in the construction of other types of sporting goods. For example, a golf club 40, shown in FIG. 10, may be constructed using graphene 32. A shaft 42 of golf club 40 may include a prepreg material similar to prepreg 22 of racket 10. The prepreg material may be constructed using processes similar to those described above with respect to prepreg 22. Additionally or alternatively, a sleeve 44 forming a grip portion 46 of golf club 40, and/or a head portion 48 of golf club 40, may include graphene 32 in a prepreg material that is similar to prepreg 22.

Figure 11:
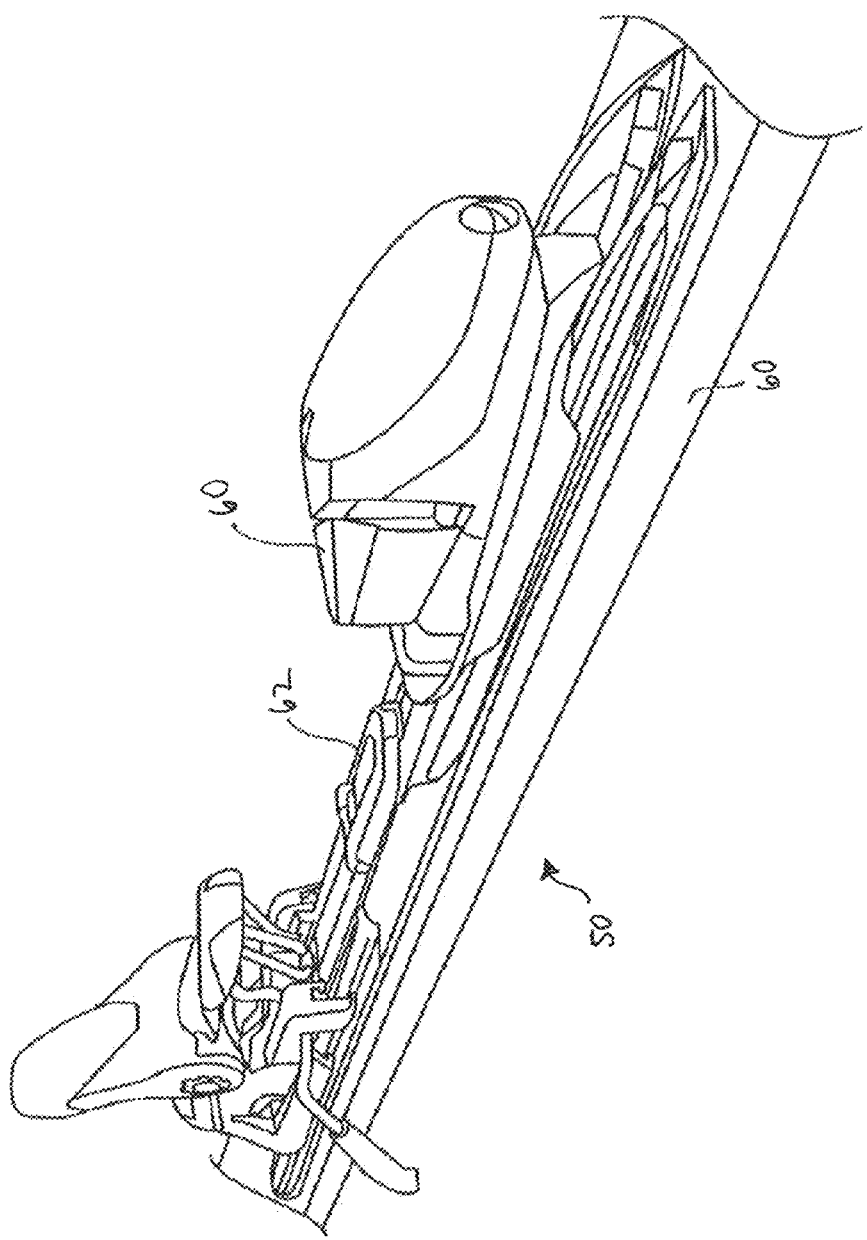
FIG. 11 is a partial perspective view of a ski, according to the present disclosure.
Figure 12:
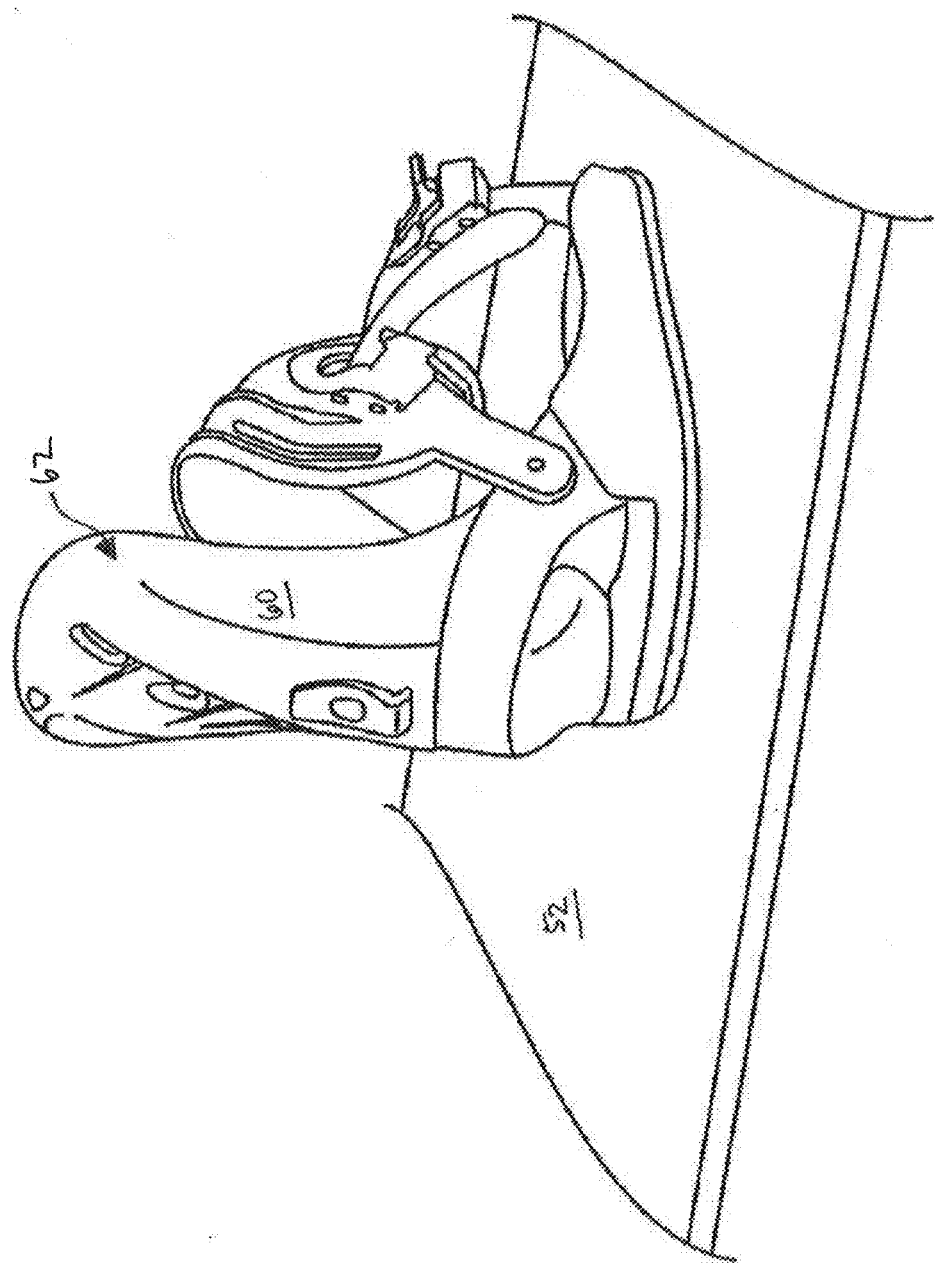
FIG. 12 is a partial perspective view of a snowboard, according to the present disclosure.

As another example, a ski 50 may be constructed using graphene 32, as shown in FIG. 11. For example, one or more layers used to form ski 50 may be formed by a prepreg layer similar to prepreg layers 28 or 28' described above. The prepreg layer may be molded in a mold (not shown) having a shape designed to impart the prepreg layer with the shape required for use in ski 50. Additionally, or alternatively, graphene-reinforced prepregs 60 may be used in the construction of a binding 62. A similar process and construction may be used for a snowboard 52, shown in FIG. 12.

Figure 13:
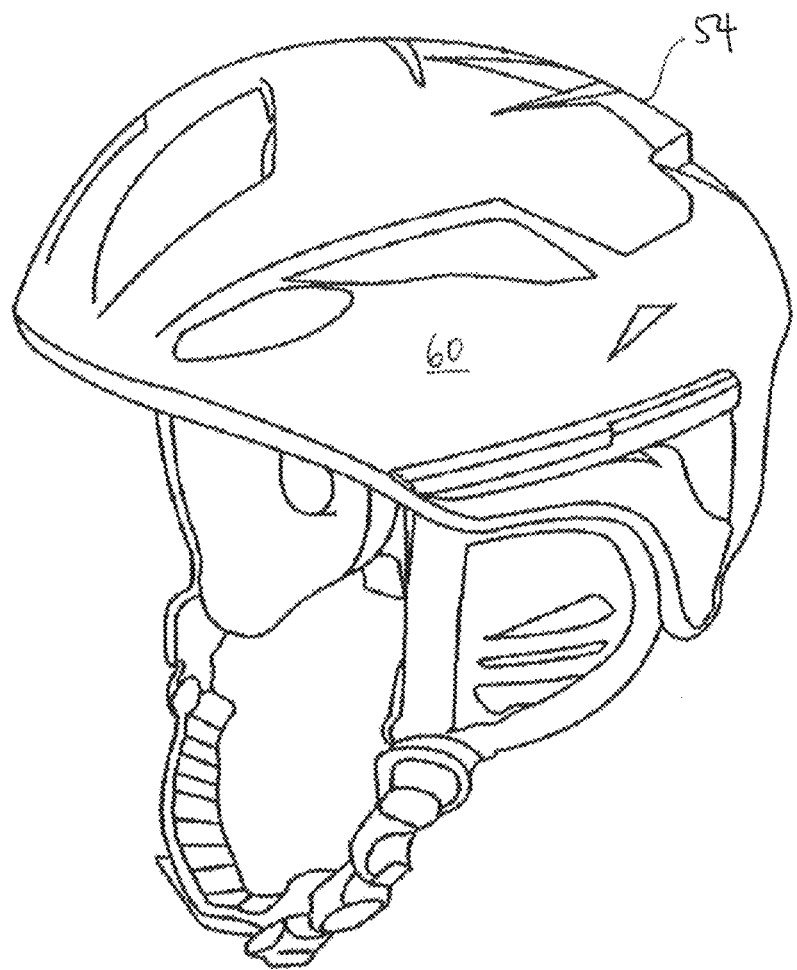
FIG. 13 is a perspective view of a helmet, according to the present disclosure.
Figure 14:
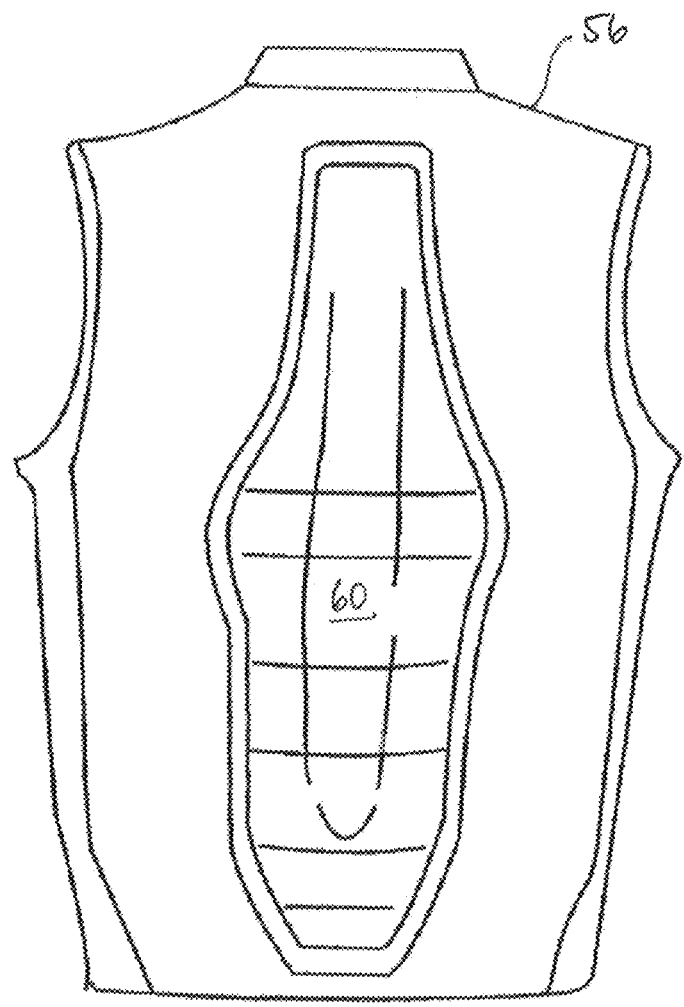
FIG. 14 is a front view of protective equipment for a torso, according to the present disclosure.
Figure 15:
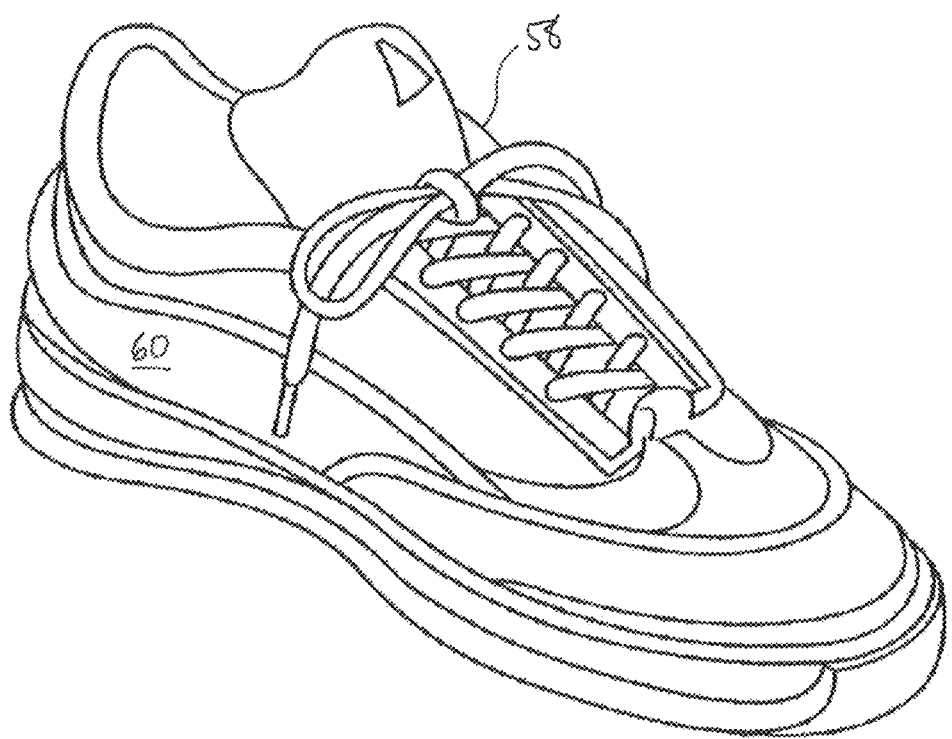
FIG. 15 is a perspective view of footwear, according to the present disclosure.

It should be understood that graphene-reinforced prepregs of virtually any shape and/or size may be constructed using the processes described above with respect to prepreg 22, by replacing the racket-shaped mold with a mold having some other desired shape. For example, graphene-reinforced prepregs 60 may be constructed for use in and/or on a helmet 54 (shown in FIG. 13), protective equipment or padding 56 (shown in FIG. 14), and/or footwear 58 (shown in FIG. 15).

Other embodiments of the disclosure will be apparent to those skilled in the art from consideration of the specification and practice of the disclosure. It is intended that the specification and examples be considered as exemplary only, with a true scope and spirit of the disclosure being indicated by the following claims.

What is claimed is:

1. A racket, comprising:
 a frame including at least one prepreg layer, the at least one prepreg layer including:
 reinforcing fibers,
 a matrix at least partially surrounding the reinforcing fibers, and
 graphene material;
 wherein the graphene material is dispersed throughout the matrix and the graphene material includes at least one of particles or flakes.

2. The racket of claim 1, wherein the frame includes a plurality of prepreg layers.

3. The racket of claim 2, wherein the plurality of prepreg layers are formed from a single continuous sheet of material.

4. The racket of claim 1, wherein the graphene material makes up approximately ten percent or less of a mixture it forms with the matrix.

5. The racket of claim 4, wherein the graphene material makes up approximately two percent or less of the mixture it forms with the matrix.

6. The racket of claim 1, wherein a volumetric content of the reinforcing fibers in the at least one prepreg layer is in the range of approximately ten percent to seventy percent.

7. A racket comprising:
 a frame including at least one prepreg layer, the at least one prepreg layer including:
 reinforcing fibers, a matrix at least partially surrounding the reinforcing fibers, and at least one layer of graphene material;

wherein the at least one graphene material layer contacts at least one of the reinforcing fibers.

8. The racket of claim 7, wherein the at least one graphene material layer is at least partially suspended in the matrix.

9. The racket of claim 7, wherein the at least one graphene material layer includes at least one sheet of graphene.

10. The racket of claim 7, wherein the at least one graphene material layer includes graphene paper.

11. The racket of claim 7, wherein the at least one graphene material layer is bonded to a surface of the matrix.

12. The racket of claim 7, wherein the frame includes a plurality of prepreg layers.

13. The racket of claim 12, wherein two prepreg layers are separated by the at least one graphene material layer.

14. The racket of claim 7, wherein the at least one graphene material layer is located in-between two reinforcing fibers.

15. A sporting good, comprising: at least one prepreg layer, including:

reinforcing fibers, a matrix at least partially surrounding the reinforcing fibers, and graphene material;

wherein the graphene material is dispersed throughout the matrix and the graphene material includes at least one of particles or flakes of graphene.

16. The racket of claim 15, wherein the graphene material makes up approximately ten percent or less of a mixture it forms with the matrix.

17. The racket of claim 16, wherein the graphene material makes up approximately two percent or less of the mixture it forms with the matrix.

18. A racket comprising:

a frame including at least one prepreg layer, the at least one prepreg layer including:

reinforcing fibers, a matrix at least partially surrounding the reinforcing fibers, and a first layer of graphene material;

wherein two prepreg layers are separated by a second layer of graphene material.

19. The racket of claim 15, wherein a volumetric content of the reinforcing fibers in the at least one prepreg layer is in the range of approximately ten percent to seventy percent.

20. A racket comprising:

a frame including at least one prepreg layer, the at least one prepreg layer including:

reinforcing fibers, a matrix at least partially surrounding the reinforcing fibers, and graphene material;

wherein the graphene material is dispersed throughout the matrix and consists of graphene nanoparticles including at least one sheet of graphene.

21. The racket of claim 20, wherein the graphene nanoparticles include less than five sheets of graphene.

22. The racket of claim 20, wherein the graphene nanoparticles include less than ten sheets of graphene.

23. The racket of claim 20, wherein the graphene nanoparticles include less than thirty sheets of graphene.

24. The racket of claim 20, wherein the graphene material makes up approximately 0.45% or less of a mixture it forms with the matrix.

25. The racket of claim 20, wherein the graphene material makes up approximately 0.14% or less of a mixture it forms with the matrix.

26. The racket of claim 20, wherein the graphene material makes up approximately 0.05% or less of a mixture it forms with the matrix.

* * * * *